United States Patent
Yamamura

(10) Patent No.: US 8,803,091 B2
(45) Date of Patent: Aug. 12, 2014

(54) DETECTION CIRCUIT, SENSOR DEVICE, AND ELECTRONIC INSTRUMENT

(75) Inventor: Mitsuhiro Yamamura, Nagano (JP)

(73) Assignee: Seiko Epson Corporation, Tokyo (JP)

(*) Notice: Subject to any disclaimer, the term of this patent is extended or adjusted under 35 U.S.C. 154(b) by 897 days.

(21) Appl. No.: 12/979,009

(22) Filed: Dec. 27, 2010

(65) Prior Publication Data

US 2011/0163232 A1    Jul. 7, 2011

(30) Foreign Application Priority Data

Jan. 6, 2010    (JP) ................................ 2010-001207

(51) Int. Cl.
*G01J 5/34*    (2006.01)
(52) U.S. Cl.
CPC ........................................ *G01J 5/34* (2013.01)
USPC ....................................................... 250/338.3
(58) Field of Classification Search
CPC ........................................................ G01J 5/34
USPC .................................. 250/338.2, 338.3, 332
See application file for complete search history.

(56) References Cited

U.S. PATENT DOCUMENTS

| 7,460,390 B2 | 12/2008 | Yamamura |
| 7,724,561 B2 | 5/2010 | Yamamura |
| 2010/0008121 A1 | 1/2010 | Yamamura |

FOREIGN PATENT DOCUMENTS

| JP | 59-142427 A | 8/1984 | |
| JP | 06-265411 A | 9/1994 | |
| JP | 10281866 A * | 10/1998 | ................ G01J 1/44 |
| JP | 2007-179664 A | 7/2007 | |
| JP | 2007-328864 A | 12/2007 | |
| JP | 2008-090937 A | 4/2008 | |
| JP | 2008-112476 A | 5/2008 | |
| JP | 2010-020838 A | 1/2010 | |

* cited by examiner

*Primary Examiner* — David Porta
*Assistant Examiner* — Faye Boosalis
(74) *Attorney, Agent, or Firm* — Global IP Counselors, LLP

(57) ABSTRACT

A detection circuit includes a current mirror circuit, a pyroelectric element, a capacitor element and a charging circuit. The pyroelectric element is disposed between a first power supply node and a first node connected to the current mirror circuit. The capacitor element is disposed between the first power supply node and a second node connected to the current mirror circuit. The charging circuit is connected to the current mirror circuit to charge the pyroelectric element and the capacitor element though the current mirror circuit.

16 Claims, 13 Drawing Sheets

DETECTION CIRCUIT, SENSOR DEVICE, AND ELECTRONIC INSTRUMENT

CROSS-REFERENCE TO RELATED APPLICATIONS

This application claims priority to Japanese Patent Application No. 2010-001207 filed on Jan. 6, 2010. The entire disclosure of Japanese Patent Application No. 2010-001207 is hereby incorporated herein by reference.

BACKGROUND

1. Technical Field

The present invention relates to a detection circuit, a sensor device, and an electronic instrument.

2. Related Art

A known conventional infrared detection circuit uses a pyroelectric element. A human body emits infrared radiation at wavelengths in a vicinity of 10 μm, and the conventional infrared detection circuit can detect the existence of a person or acquire temperature information regarding a person in a non-contact fashion by detecting such radiation. Thus, this kind of infrared detection circuit can be used to detect intruders and to measure physical quantities.

Examples of known technologies for infrared detecting circuits are disclosed in Japanese Laid-Open Patent Publication No. 59-142427 and Japanese Laid-Open Patent Publication No. 6-265411. The conventional technology presented in Japanese Laid-Open Patent Publication No. 59-142427 is configured to read a pyroelectric current of a pyroelectric element while using a chopper to cyclically expose and interrupt exposure of a pyroelectric element to infrared radiation.

The conventional technology presented in Japanese Laid-Open Patent Publication No. 6-265411 uses a method in which a pulsed voltage is applied to a pyroelectric element. That is, an amount of spontaneous polarization exhibited by the pyroelectric element, which is made of a ferroelectric material, changes in response to a temperature of the pyroelectric element and the temperature of the pyroelectric element changes due to infrared radiation incident on the pyroelectric element. Thus, by measuring an amount of surface charge of the pyroelectric element, which changes in response to the amount of spontaneous polarization, an amount of incident infrared radiation can be measured.

SUMMARY

However, these conventional technologies have such challenges as it being necessary to synchronize the chopper with the FPA and the service life of the chopper being short, or as it being difficult to achieve a high resolution because a detected voltage only changes slightly in response to a temperature change and large variations in performance occurring due to fluctuations in a manufacturing process.

With several aspects of the present invention, a detection circuit, a sensor device, and an electronic instrument can be provided that can suppress variations caused by fluctuations in a manufacturing process and achieve a high resolution.

One aspect of the present invention relates to a detection circuit that includes a current mirror circuit, a pyroelectric element, a capacitor element and a charging circuit. The pyroelectric element is disposed between a first node connected to the current mirror circuit and a first power supply node. The capacitor element is disposed between a second node connected to the current mirror and the first power supply node. The charging circuit is connected to the current mirror circuit to charge the pyroelectric element and the capacitor element through the current mirror circuit.

In this aspect of the present invention, the pyroelectric element is provided between the first node of a current mirror circuit and the first power supply node, and the capacitor element is provided between the second node of the current mirror circuit and the first power supply node. The charging circuit serves to execute an operation of charging the pyroelectric element and the capacitor element through the current mirror circuit. In this way, a total amount of electric current flowing when the pyroelectric element is charged can be converted into a voltage using the capacitor element. As a result, a detection circuit capable of setting a higher resolution can be achieved.

In this aspect of the present invention, it is acceptable if the charging circuit is configured such to charge the pyroelectric element and the capacitor element for a prescribed charging time period before a detection voltage is acquired from the second node.

In this way, the voltage of the second node can be acquired as a detection voltage after the charging operation has been executed for the prescribed amount of time and the voltage as stabilized.

In this aspect of the present invention, it is also acceptable if the detection circuit includes a discharging circuit disposed between the first and second nodes and the first power supply node to discharge the pyroelectric element and the capacitor element.

In this way, since the discharging circuit serves to discharge the pyroelectric element and the capacitor element, a preparation for acquiring a detection voltage with the charging operation can be accomplished without using a chopper or the like.

In this aspect of the present invention, it is also acceptable if the discharging circuit is configured to discharge the pyroelectric element and the capacitor element after a detection voltage has been acquired from the second node.

In this way, after a detection voltage has been acquired, a preparation for acquiring a detection voltage again with the charging operation can be accomplished by executing an operation of discharging the pyroelectric element and the capacitor element.

In this aspect of the present invention, it is also acceptable if the pyroelectric element includes a pyroelectric material and the pyroelectric element is exposed to infrared radiation, and the capacitor element includes the pyroelectric material and the capacitor element is blocked from exposure to the infrared radiation.

By using a pyroelectric element as a capacitor element, variations caused by fluctuations in a manufacturing process can be suppressed and a stable detection voltage can be acquired.

In this aspect of the present invention, it is also acceptable if the current mirror circuit includes a first current mirror transistor disposed between the charging circuit and the first node with a gate and a drain of the first current mirror transistor being connected to the first node, and a second current mirror transistor disposed between the charging circuit and the second node with a gate of the second current mirror transistor being connected to the first node and a drain of the second current mirror transistor being connected to the second node.

In this way, a detection voltage can be adjusted by setting a current mirror ratio between the first and second current mirror transistors.

In this aspect of the present invention, it is also acceptable if the charging circuit includes at least one charging transistor disposed between a second power supply node and the current mirror circuit, and the at least one charging transistor is configured to turn on during a charging time period when the pyroelectric element and the capacitor element are being charged and to turn off during a discharging time period when the pyroelectric element and the capacitor element are being discharged.

In this way, the pyroelectric element and the capacitor element can be charged and discharged by controlling the on-off state of the charging transistor.

In this aspect of the present invention, it is also acceptable if the detection circuit includes a timing regulating circuit, and the charging circuit is configured to start charging the pyroelectric element and the capacitor element at a first timing designated by the timing regulating circuit so that a detection voltage is acquired from the second node at a second timing that is designated by the timing regulating circuit and later than the first timing.

In this way, charging of the pyroelectric element and the capacitor element is started at a first timing and acquisition of a detection voltage from the second node can be executed at a second timing that is later than the first timing.

In this aspect of the present invention, it is also acceptable if the detection circuit includes a timing regulating circuit, and the discharging circuit is configured to start discharging the pyroelectric element and the capacitor element at a timing that is designated by the timing regulating circuit and later than a timing that is designated by the timing regulating circuit at which t a detection voltage is acquired from the second node.

In this way, acquisition of a detection voltage from the second node can be executed at a prescribed timing and the operation of discharging the pyroelectric element and the capacitor element can be started at a timing that is later than the prescribed timing.

Another aspect of the present invention relates to a sensor device that includes any of the detection circuits described above and a timing regulating circuit, and the charging circuit is configured to start charging the pyroelectric element and the capacitor element at a first timing designated by the timing regulating circuit so that a detection voltage is acquired from the second node at a second timing that is designated by the timing regulating circuit and later than the first timing.

Another aspect of the present invention relates to a sensor device that includes any of the detection circuits described above and a timing regulating circuit and the discharging circuit is configured to start discharging the pyroelectric element and the capacitor element at a timing that is designated by the timing regulating circuit and later than a timing that is designated by the timing regulating circuit at which t a detection voltage is acquired from the second node.

Another aspect of the present invention relates to a sensor device that includes a sensor array having a plurality of sensor cells, one or more row lines, one or more column lines, a row selecting circuit, and a read circuit. The row selecting circuit is connected to the one or more row lines. The read circuit is connected to the one or more column lines. The read circuit includes one or more capacitor elements respectively connected to one or more column lines. Each of the sensor cells includes a current mirror circuit, a pyroelectric element disposed between a first node connected to the current mirror circuit and a first power supply node, and a charging circuit connected to the current mirror circuit to charge the pyroelectric element and the capacitor element through the current mirror circuit.

In this other aspect of the present invention, the read circuit has a corresponding capacitor element provided with respect to each of the column lines. Also, a current mirror circuit, a pyroelectric element, and a charging circuit are provided in each of the sensor cells. The charging circuit serves to execute an operation of charging the pyroelectric element and the capacitor through the current mirror circuit. In this way, a total amount of electric current flowing when the pyroelectric element is charged can be converted into a voltage using the capacitor element. As a result, a sensor device capable of setting a higher resolution can be achieved.

In this other aspect of the present invention, it is acceptable if each of the sensor cells includes a sensor cell discharging circuit disposed between the first node and the first power supply node to discharge the pyroelectric element.

In this way, the pyroelectric element of each sensor cell can be discharged using the sensor cell discharging circuit provided in each sensor cell.

In this other aspect of the present invention, it is also acceptable if the read circuit includes one or more read circuit discharging circuits disposed between the one or more column lines, respectively, and the first power supply node to discharge the capacitor element.

In this way, the column line can be discharged using the read circuit discharging circuit provided in the read circuit.

Still another aspect of the present invention relates to an electronic instrument that includes any of the detection circuits described above.

Still another aspect of the present invention relates to an electronic instrument that includes any of the sensor devices described above.

BRIEF DESCRIPTION OF THE DRAWINGS

Referring now to the attached drawings which form a part of this original disclosure.

DETAILED DESCRIPTION OF EXEMPLARY EMBODIMENTS

Figure 1A:
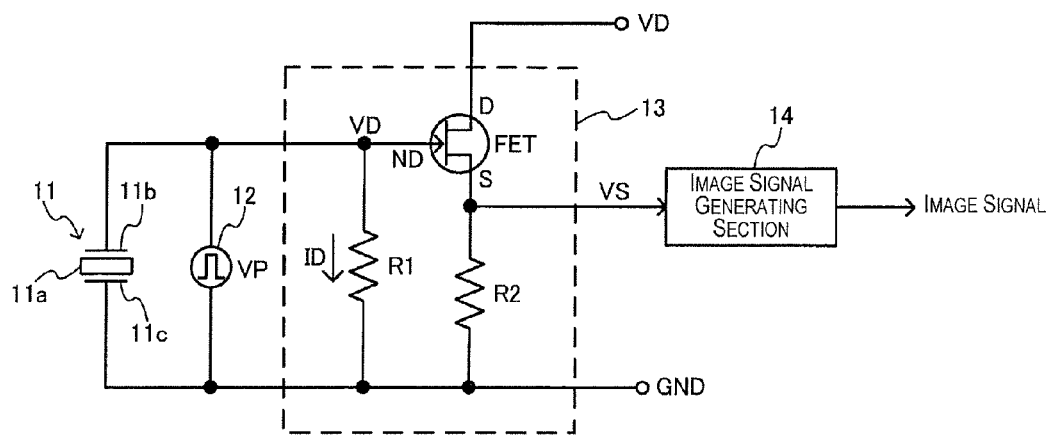
FIGS. 1A and 1B are circuit diagrams for explaining comparative examples of detection circuits.

A preferred embodiment of the present invention will now be explained in detail. The embodiment explained hereinafter does not unduly limit the content of the present invention as presented in the claims, and not all of the constituent features explained in the embodiments are essential for achieving the object of the present invention. In view of the similarity between various examples of the embodiment, the parts of that are identical will be given the same reference numerals.

1. Comparative Example

In order to facilitate understanding of the embodiments according to the present invention, some comparative examples of detection circuits will be explained with reference to FIGS. 1A to 2B.

FIG. 1A shows a first comparative example of a circuit configuration. The detection circuit according to this comparative example includes a pyroelectric element 11, a pulse generating circuit 12, an impedance converting circuit 13, and an image signal generating section 14. The impedance converting circuit is a source follower circuit and includes resistors R1 and R2 and an FET.

The pyroelectric element 11 is exposed to infrared radiation and a pyroelectric material (ferroelectric material) 11a of the pyroelectric element 11 exhibits a spontaneous polarization corresponding to a temperature of the pyroelectric element 11. The pyroelectric element 11 maintains an electrically neutral state in a stationary condition as the surface charges of electrodes 11b and 11c are combined with the spontaneous polarization of the pyroelectric material 11a.

Figure 1B:
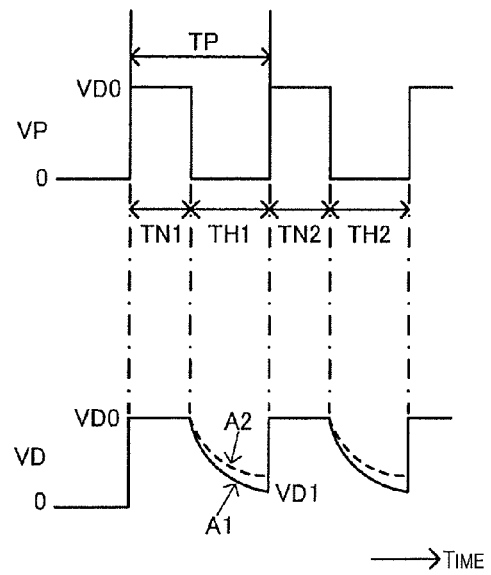

A pulse generating circuit 12 generates a pulse signal VP as shown in FIG. 1B and applies a voltage to the pyroelectric element 11. When the voltage of the pulse signal VP is not applied to the pyroelectric element 11, an output of the pulse generating circuit 12 is set to a high impedance state.

During a time period TN1 indicated in FIG. 1B, the pulse generating circuit 12 applies a voltage VD0 of the pulse signal VP to the pyroelectric element 11 and a voltage VD of a node ND becomes equal to VD0. As a result, an electric charge is drawn to the electrodes 11b and 11c of the pyroelectric element 11. More specifically, for example, a positive electric charge is drawn to the electrode 11b on a positive potential side of the pyroelectric element 11 and a negative electric charge is drawn to the electrode 11c on a negative side, thus constituting an operation of charging the pyroelectric element 11.

In a subsequent time period TH1, the pulse generating circuit 12 stops applying the voltage VD0 and the electric charges drawn to the electrodes 11b and 11c of the pyroelectric element 11 are discharged through the resistor R1. For example, the positive electric charge is discharged from the electrode 11b on the positive potential side toward the resistor R1 and the negative electric charge is discharged from the electrode 11c on the negative potential side toward the resistor R1. Thus, a detection current ID flows through the resistor R1 and a voltage VD produced at the node ND is acquired as a detection voltage As indicated by A1 in FIG. 1B, the voltage change, i.e., the discharge characteristic, of detection voltage VD is in accordance with a time constant CR that is determined based on a capacitance value of the pyroelectric element 11 and a resistance value of the resistor R1. The capacitance value of the pyroelectric element 11 increases with increasing temperature. Thus, when the temperature is higher, the voltage change of the detection voltage VD is more gradual than A1, as indicated by A2 in FIG. 1B.

As shown in FIG. 1B, the pulse signal VP has a cyclical period TP and the voltage VD0 is applied again in a subsequent time period TN2 before all of the charge stored in the pyroelectric element 11 during the time period TN1 and discharged during the time period TH1 has fully discharged. Thus, the voltage VD of the node ND does not reach 0 V by the beginning of the time period TN2 and instead reaches a voltage VD1 (VD=VD1). In other words, if the time period TH1 were sufficiently long, all of the electric charge stored in the pyroelectric element 11 would be discharged and the voltage VD would reach 0 V because the electric charge of the electrodes 11b and 11c and the electric charge resulting from spontaneous polarization would become electrically neutralized.

As mentioned previously, the capacitance value of the pyroelectric element 11 increases with increasing temperature. Thus, as is clear from A1 and A2 in FIG. 1B, the higher the temperature is, the higher the voltage VD of the node ND is at the beginning of the time period TN2.

In the comparative example shown in FIG. 1A, the pyroelectric element is charged by applying a voltage (VD0) to both ends of the pyroelectric element and, afterwards, the pyroelectric element is discharged so as to produce an electric current (ID). An amount of infrared radiation is detected by converting the amount of electric current into a voltage (VD) using a resistor (R1).

More specifically, the voltage (VD) stored in the pyroelectric element will decrease more rapidly if the electric current (ID) discharged through the resistor (R1) is large, and the voltage stored in the pyroelectric element will decrease more slowly if the discharged electric current is small. Therefore, the amount of infrared radiation is detected by measuring a voltage (VD) existing across the pyroelectric element after the stored electric charge has been discharged for a prescribed amount of time (i.e., the time period TH1 in FIG. 1B).

Figure 2A:
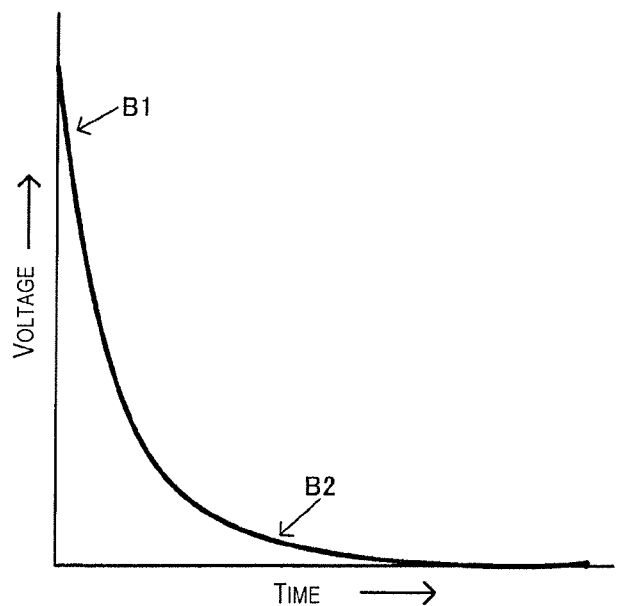
FIGS. 2A and 2B show an example of a discharge characteristic of a pyroelectric element.

FIG. 2A shows an example of a discharge characteristic of the pyroelectric element. FIG. 2A corresponds to the voltage VD characteristics indicated by A1 and A2 in FIG. 1B.

As indicated by B1 in FIG. 2A, the voltage can be measured easily immediately after the operation of discharging the pyroelectric element because the voltage (VD) existing across the pyroelectric element is high. However, the measurement error at B1 in FIG. 2A is large because the rate of change of the voltage with respect to time is large. Thus, the measured voltage changes greatly depending on the timing (sampling timing) at which the voltage is measured.

Meanwhile, as indicated by B2 in FIG. 2A, the rate at which the voltage decreases is smaller and, thus, the measurement error is smaller after the pyroelectric element has be discharged to a certain degree. Thus, the measured voltage does not change so much even if the timing at which the voltage is measured varies. However, at the section indicated by B2 in FIG. 2A, it is difficult to measure the voltage because the voltage is small.

Figure 2B:
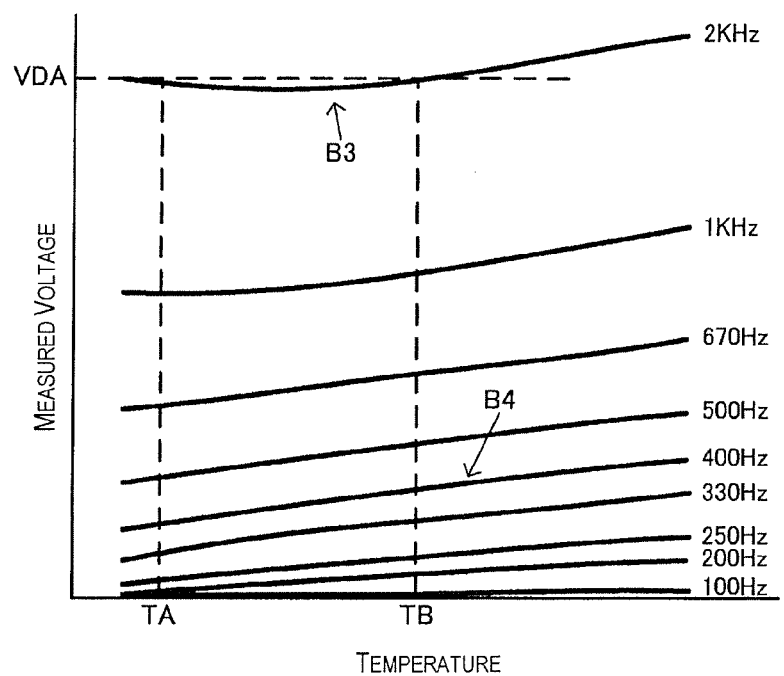

FIG. 2B shows how a measured voltage versus temperature characteristic varies depending on frequency. Thus, FIG. 2B shows how the measured voltage versus temperature characteristic varies when the cyclic period TP of the pulse signal VP shown in FIG. 1B is varied. For example, when the cyclic period TP of the pulse signal VP shown in FIG. 1B is lengthened, i.e., the frequency is decreased (e.g., to 100 Hz), the measurement timing (timing at which VD1 sampled) is later and the measured voltage (VD1) is lower. Conversely, when the cyclic period TP is shortened, i.e., the frequency is increased (e.g., to 2 KHz), the measurement timing is earlier and the measured voltage is higher.

In a high frequency region (immediately after discharging is started), the measured voltage versus temperature characteristic deviates greatly from a linear shape such that, for example, it sags downward as indicated by B3 in FIG. 2B. Meanwhile, in a low frequency region (at a time when the discharging is somewhat advanced), the measured voltage versus temperature characteristic deviates from a linear shape such that, for example, it is upwardly convex as indicated by B4. The reason for this phenomenon is that the temperature characteristic of the pyroelectric element is inherently nonlinear and the nonlinearity varies depending on temperature. When the measured voltage versus temperature characteristic is nonlinear, there is a possibility that measurement error will occur. For example, when the measured voltage is VDA as shown in FIG. 2B, the temperature might be measured to be TA or measured to be TB.

Also, since the output voltage (voltage across both ends of the pyroelectric element) in the comparative example shown in FIG. 2A is obtained by converting a transient electric current (ID) into a voltage based on a resistor (R1), the total amount of electric current is not necessarily converted into a voltage. Consequently, the output voltage does not reflect the entire change in the amount of surface charge of the pyroelectric element caused by temperature. As a result, the change in the output voltage with respect to temperature is gradual. Furthermore, in a low frequency region, since the output voltage is saturated close to 0 V, the temperature slow is smaller and it is very difficult to detect a temperature difference.

With the comparative example illustrated in FIGS. 1A to 2B, the range of frequencies in which the circuit can be used in a stable fashion is small and the measurement performance is easily degraded if the frequency drifts toward a high frequency region or a low frequency region due to variations in a manufacturing process. In other words, the measurement accuracy will degraded if the clock frequency of the pulse signal fluctuates due to process variations. Additionally, a high resolution cannot be achieved because the rate of change of the output voltage with respect to changes in temperature is low.

2. Overall Configuration of Detection Circuit

Figure 3:
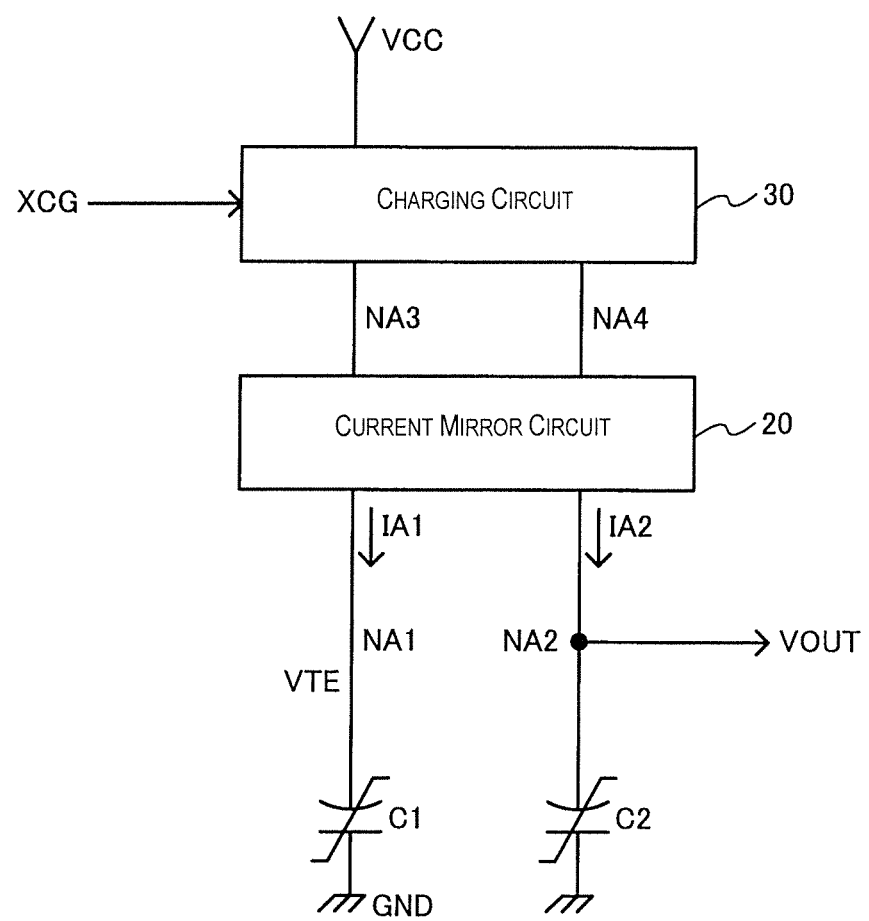
FIG. 3 is a diagram showing a basic example of a detection circuit according to an embodiment.

FIG. 3 shows basic constituent features of a detection circuit according to an embodiment that can resolve the problems explained above. As shown in FIG. 3, the detection circuit includes a current mirror circuit 20 and a charging circuit 30. The detection circuit also includes a pyroelectric element C1 and a capacitor element C2.

The pyroelectric element C1 (e.g., infrared detection element, heat detection element, ferroelectric element) is provided between a ground node GND (broadly called a first power supply node) and a first node NA1 (first current mirror node) of the current mirror circuit 20. The pyroelectric element C1 comprises a pyroelectric material (ferroelectric material or pyroelectric film) and first and second electrodes provided on two ends of the pyroelectric element. The pyroelectric material is, for example, a film made of PZT (lead zirconate titanate) or another ferroelectric substance and exhibits spontaneous polarization. As explained regarding A1 and A2 of FIG. 1B, the capacitance value of the pyroelectric element C1 changes depending on temperature. For example, the capacitance value of the pyroelectric element C1 increases when the temperature increases due to incident infrared radiation. It is possible to conceive a variation of the embodiment that does not include a pyroelectric element C1 as a constituent component in the detection circuit.

The capacitor element C2 is provided between the ground node GND (first power supply node) and a second node NA2 (second current mirror node) of the current mirror circuit 20. Although a capacitance value of the pyroelectric element C1 varies in accordance with temperature changes (changes in infrared radiation) as explained previously, a capacitance value of the capacitor element C2 is constant with respect to temperature changes or varies to a much smaller degree with respect to temperature changes than the capacitance value of the pyroelectric element C1. As will be explained later, the capacitor element C2 is, for example, a pyroelectric element. Additionally, while the pyroelectric element C1 is exposed to infrared radiation, the capacitor element C2 is a pyroelectric element from which infrared radiation is blocked. It is possible to conceive a variation of the embodiment that does not include a capacitor element C2 as a constituent component in the detection circuit.

The current mirror circuit 20 passes an electric current IA2 (current mirror current) to the capacitor element C2 via the node NA2 as a charging current, the electric current IA2 corresponding to the electric current IA1 flowing to the pyroelectric element C1 via the node NA1. For example, the electric current IA2 sent to the capacitor element C2 is K times (K>0) as large as the electric current IA1.

The charging circuit 30 executes an operation of charging the pyroelectric element C1 and the capacitor element C2 through the current mirror circuit 20. For example, the charging circuit 30 starts the charging operation when a charging control signal XCG (negative logic) becomes active (L level). An electric current from a VCC node (broadly called a second power supply node) is passed through the current mirror circuit 20 and sent to the pyroelectric element C1 and the capacitor element C2 as the electric currents IA1 and IA2. In this way, an operation of charging the pyroelectric element C1 and the capacitor element C2 is executed.

After the charging circuit 30 has executed an operation of charging the pyroelectric element C1 and the capacitor element C2 for a prescribed charging time period, an output voltage VOUT is acquired from the node NA2 as a detection voltage. That is, a voltage acquiring circuit of an A/D converting section or the like acquires a detection voltage. For example, the output voltage VOUT is sampled and the sampled output voltage VOUT is converted by the A/D converting section into digital detection data corresponding to the output voltage VOUT.

As explained previously, when the pyroelectric element C1 is exposed to infrared radiation, a temperature of the pyroelectric element C1 increases and the capacitance value of the pyroelectric element C1 increases. Meanwhile, a capacitance value of the capacitance element C2 remains fixed or changes by only a very small amount. Thus, an amount of infrared radiation can be detected because the output voltage VOUT increases accordingly when the temperature of the pyroelectric element C1 increases due to the incident infrared radiation.

Figure 4:
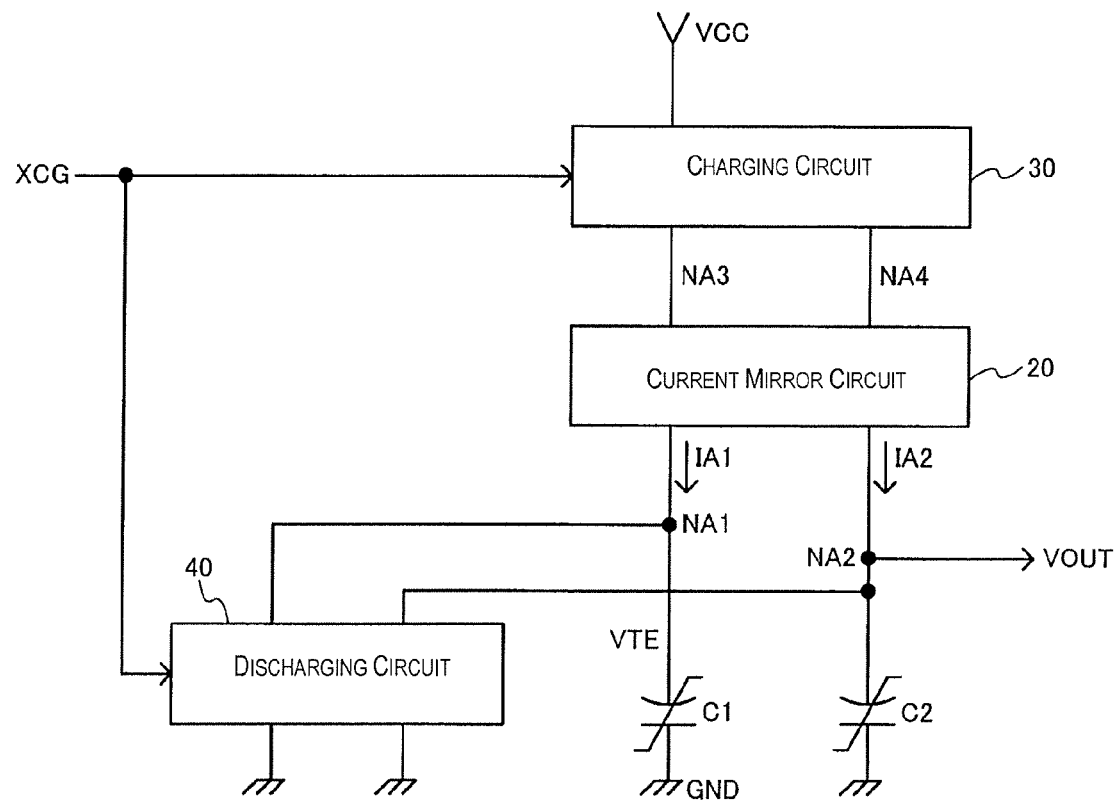
FIG. 4 is a diagram showing an alternative example of a detection circuit provided with a discharging circuit according to the embodiment.

FIG. 4 shows an alternative example of a detection circuit in which a discharging circuit 40 is further provided. The discharging circuit 40 is provided between the ground node GND (first power supply node) and the first and second nodes NA1 and NA2 of the current mirror circuit 20. In this way, an operation of discharging the pyroelectric element C1 and the capacitor element C2 is executed.

More specifically, the discharging circuit 40 executes the operation of discharging the pyroelectric element C1 and the capacitor element C2 after the detection voltage has been acquired from the node NA2. For example, when a control signal XCG from a control circuit (not shown) becomes active (low level), a detection voltage is acquired by means of the charging circuit 30 executing an operation of charging the pyroelectric element C1 and the capacitor element C2. Afterwards, when the control signal XCG becomes inactive (high level), the discharging circuit 40 executes an operation of discharging the pyroelectric element C1 and the capacitor element C2. As a result, the voltage across both ends of each of the elements C1 and C2 is reset to 0 V. After that, the control signal XCG becomes active (low level) again and the charging circuit 30 executes the operation of charging the pyroelectric element C1 and the capacitor element C2.

In FIG. 4, one control signal XCG is used to control both the charging operation and the discharging operation. However, it is acceptable if a charge control signal and a separate discharge control signal are provided and the discharging operation of the discharging circuit 40 is controlled with the discharge control signal.

Figure 5:
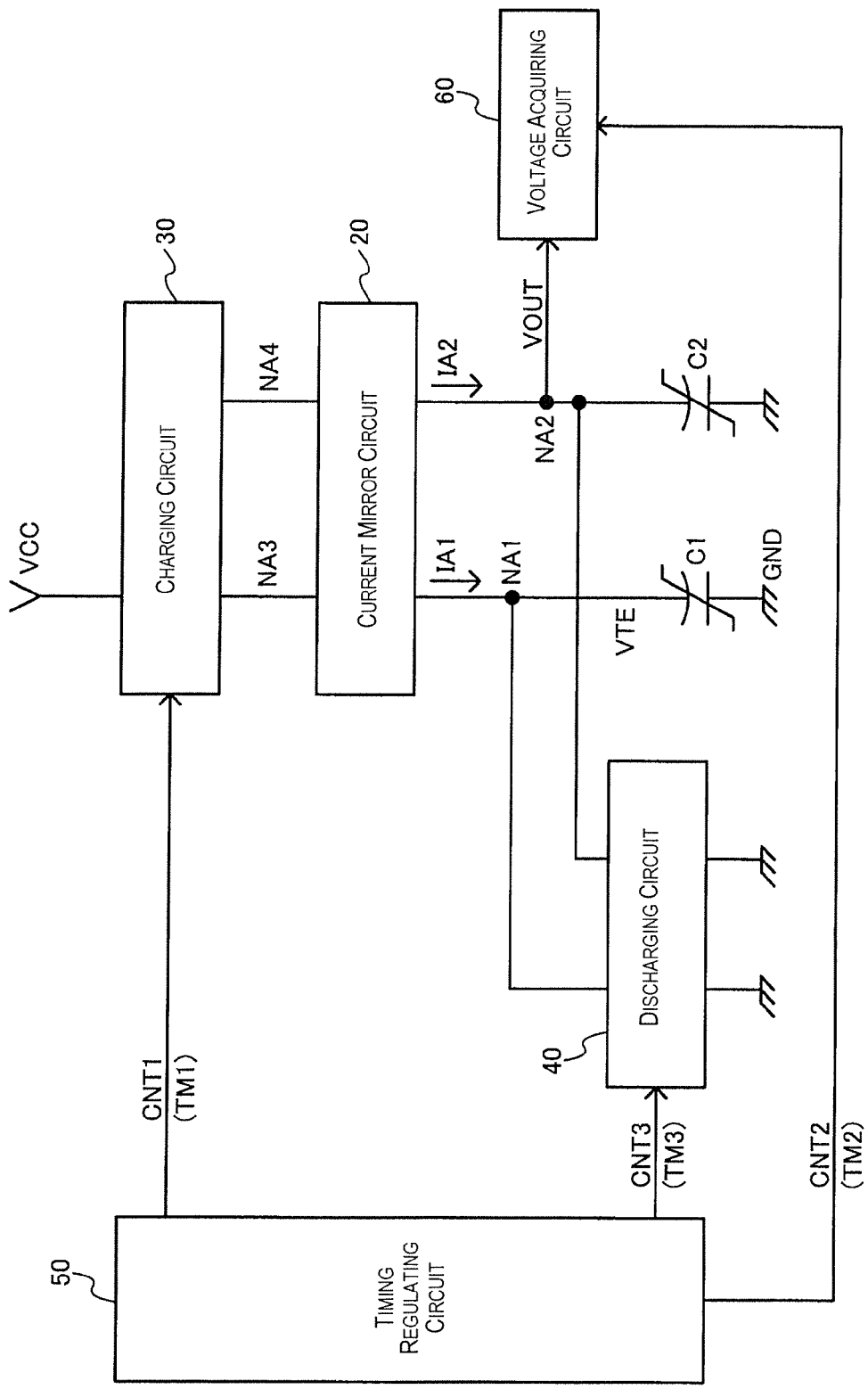
FIG. 5 is a diagram showing an alternative example of a detection circuit provided with a timing regulating circuit and a voltage acquiring circuit according to the embodiment.

FIG. 5 shows an alternative example of a detection circuit in which a timing regulating circuit 50 and a voltage acquiring circuit 60 are further provided.

The timing regulating circuit 50 is configured to regulate (designate or set) timings of various operations of the detection circuit. More specifically, the timing regulating circuit 50 designates a first timing TM1 as a charging operation start timing of the charging circuit 30, a second timing TM2 as a detection voltage acquisition timing of the voltage acquiring circuit 60, and a third timing TM3 as a discharging operation start timing of the discharging circuit 40. The first, second, and third timings TM1, TM2, and TM3 are designated using first, second, and third control signals CNT1, CNT2, and CNT3.

As explained with reference to FIG. 4, it is acceptable to designate the timing TM1 (charging operation start timing) and the timing TM3 (discharging operation start operation) using a common (the same) control signal XCG.

The voltage acquiring circuit 60 is a circuit configured to acquire a detection voltage VOUT of the node NA2. Specifically, the detection voltage TOUT is acquired (sampled) at the timing TM2 designated by the timing regulating circuit 50. The voltage acquiring circuit 60 comprises, for example, an A/D converting section.

In the example shown in FIG. 5, the charging circuit 30 starts an operation of charging the pyroelectric element C1 and the capacitor element C2 at a timing TM1 designated by the timing regulating circuit 50. More specifically, the charging operation starts when the control signal CNT1 becomes active at the timing TM1. Then, at a timing TM2 designated by the timing regulating circuit 50, the detection voltage VOUT is acquired from the node NA2. More specifically, the voltage acquiring circuit 60 acquires the detection voltage VOUT when the control signal CNT2 becomes active at the timing TM2. Here, the timing TM2 is a later timing than the timing TM1. That is, the control signal CNT2 becomes active at a later time than the control signal CNT1.

Also, in the example shown in FIG. 5, the detection voltage VOUT is acquired from the node NA2 at a timing TM2 designated by the timing regulating circuit 50 and the discharging circuit 40 starts an operation of discharging the pyroelectric element C1 and the capacitor element C2 at a timing TM3 designated by the timing regulating circuit 50. More specifically, the detection voltage VOUT is acquired when the control signal CNT2 becomes active at the timing TM2 and the discharging operation is started when the control signal CNT3 becomes active at the timing TM3. Here, the timing TM3 is a later timing than the timing TM2. That is, the control signal CNT3 becomes active later than the control signal CNT2.

If a common signal (e.g., the signal XCG shown in FIG. 4) is used as the control signals CNT1 and CNT3, then the detection circuit is configured such that the charging circuit 30 starts a charging operation at a timing TM1 when the common control signal is at a first voltage level (e.g., the low level) and the discharging circuit 40 starts a discharging operation at a timing TM3 when the common control signal is at a second voltage level (e.g., high level).

Although FIG. 5 illustrates a case in which a timing regulating circuit 50 and a voltage acquiring circuit 60 are provided inside the detection circuit, it is also acceptable to provide a timing regulating circuit 50 and voltage acquiring circuit 60 externally of the detection circuit. For example, a sensor device shown in FIG. 12A (explained later) includes a detection circuit, a timing regulating circuit 50, and a voltage acquiring circuit 60, the detection circuit having a current mirror circuit 20, a charging circuit 30, and a discharging circuit 40. The timing regulating circuit 50 is provided in, for example, the control circuit 150 shown in FIG. 12A, and the function of the voltage acquiring circuit 60 is accomplished with the A/D converting section 130.

Providing the timing regulating circuit 50 as shown in FIG. 5 makes it possible to adjust and set the charging operation start timing (timing TM1) of the charging circuit 30, the detection voltage acquisition timing (timing TM2) of the voltage acquiring circuit 60, and the discharging operation start timing (timing TM3) of the discharging circuit 40. As a result, a timing control that is appropriate in view of the characteristics of the pyroelectric element C1 and the capacitor C2 can be accomplished. By starting an operation charging the elements C1 and C2 at a timing TM1, acquiring the detection voltage VOUT at a timing TM2, and starting an operation of discharging the elements C1 and C2 at a timing TM3, the charging operation and the discharging operation can be executed at appropriate timings and the detection voltage VOUT can be acquired without using a chopper.

3. Detailed Configuration of Detection Circuit

Figure 6:
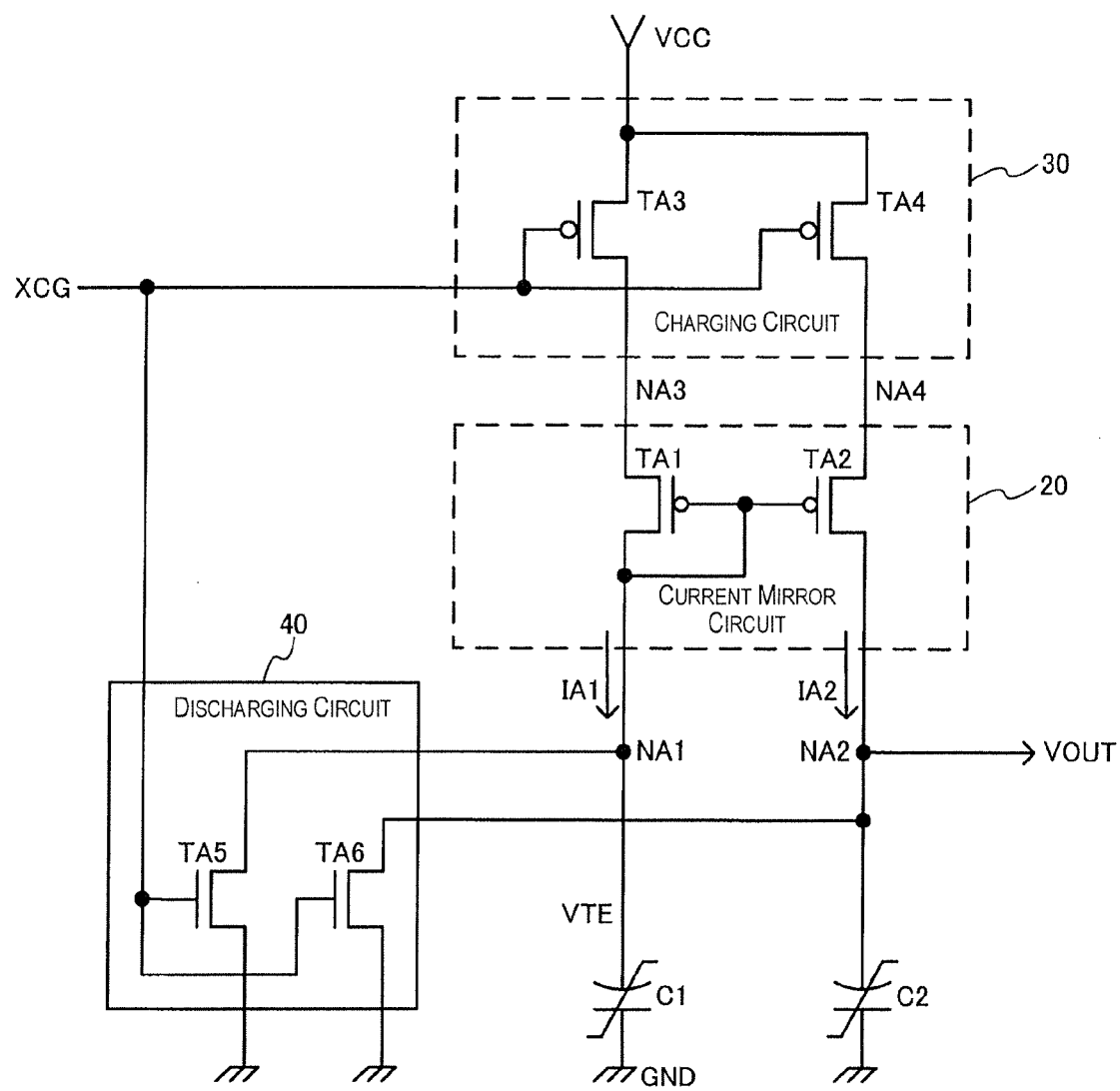
FIG. 6 a circuit diagram showing a detailed configuration of the detection circuit illustrated in FIG. 3 according to the embodiment.

FIG. 6 shows a detailed configuration of the detection circuit illustrated in FIG. 3 according to the embodiment. As shown in FIG. 6, this example has a current mirror circuit 20, a charging circuit 30, and a discharging circuit 40. A detection circuit according to the embodiment is not limited to the constituent features shown in FIG. 6. Instead, it is possible for a portion of these components to be omitted, other components to be added, and/or the configuration of the connections between the components to be changed to obtain different variations of the embodiment.

As shown in FIG. 6, the current mirror circuit 20 includes a P-type first current mirror transistor TA1 and a P-type second current mirror transistor TA2. The first current mirror transistor TA1 is provided between the charging circuit 30 (node NA3) and a node NA1 such that its gate and drain are connected to the node NA1. The second current mirror transistor TA2 is provided between the charging circuit 30 (node NA4) and a node NA2 such that its gate is connected to the node NA1 and its drain is connected to the node NA2. By setting, for example, a W-to-L ratio of the transistors TA1 and TA2, a current mirror ratio (i.e., a ratio of the currents IA1 and IA2) can be set.

The charging current 30 includes P-type charging transistors TA3 and TA4. The charging transistors TA3 and TA4 are provided between a VCC node (broadly called a second power supply node) and the current mirror circuit 20 (nodes NA3 and NA4). More specifically, a drain node of the charging transistor TA3 is connected to a source node of the current mirror transistor TA1, and a drain node of the charging transistor TA4 is connected to a source node of the current mirror transistor TA2.

The charging transistors TA3 and TA4 turn on during a period when the pyroelectric element C1 and the capacitor element C2 are being charged. Meanwhile, the transistors TA3 and TA4 turn off during a period when the elements C1 and C2 are being discharged. More specifically, the charging transistors TA3 and TA4 turn on when the control signal XCG is at a low level (active) and turn off when the control signal XCG is at a high level (inactive).

Although two charging transistors TA3 and TA4 are provided in the example shown in FIG. 6, it is acceptable to have only one charging transistor. In such a case, assuming that, for example, the charging transistor TA4 is omitted, the drain node of the charging transistor TA3 is connected to the source nodes of both current mirror transistors TA1 and TA2.

The discharging current 40 includes N-type discharging transistors TA5 and TA6. The discharging transistors TA5 and TA6 are provided between the ground node (first power supply node) and the nodes NA1 and NA2, respectively. More specifically, a drain node of the discharging transistor TA5 is connected to a drain node of the current mirror transistor TA1, and a drain node of the discharging transistor TA5 is connected to a drain node of the current mirror transistor TA2.

The discharging transistors TA5 and TA6 turn on during a period when the pyroelectric element C1 and the capacitor element C2 are being discharged. Meanwhile, the transistors TA5 and TA6 turn off during a period when the elements C1 and C2 are being charged. More specifically, the discharging transistors TA5 and TA6 turn on when the control signal XCG is at a high level (inactive) and turn off when the control signal XCG is at a low level (inactive).

In the detection circuit according to the embodiment described above, a total amount of electric current flowing when the pyroelectric element C1 is charged is used as physical quantity that is dependent on an amount of surface charge of the pyroelectric element C1. The total amount of electric current is extracted using the current mirror circuit 20 and converted into a voltage using the capacitor element C2 in order to detect an amount of infrared radiation. In the comparative example shown in FIG. 1A, a detection of infrared radiation is accomplished by using a resistor R1 to convert an electric current flowing during a discharging period (TH1 and TH2) into a voltage. In contrast, in this embodiment, an amount of infrared radiation is detected by using a capacitor element C2 to convert a total amount of electric current flowing during a charging period (in which the pyroelectric element C1 is charged) into a voltage.

Figure 7:
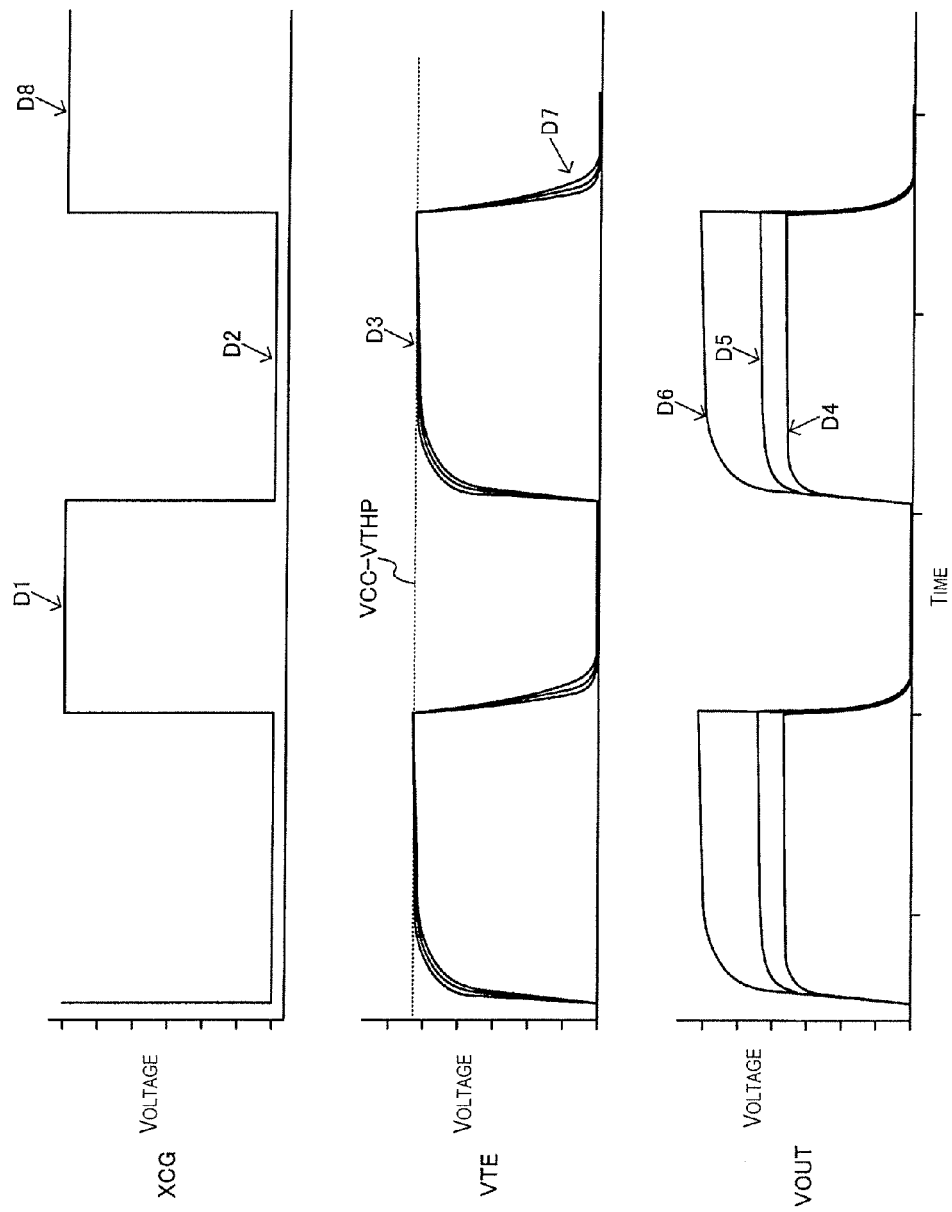
FIG. 7 is a diagram showing signal waveforms for explaining the operation of a detection circuit according to the embodiment.

FIG. 7 shows examples of signal waveforms for explaining the operation of this embodiment. When the control signal XCG goes to a high level as indicated by D1 in FIG. 7, the N-type discharging transistors TA5 and TA6 turn on and the nodes NA1 and NA2 are set to a ground level GND such that the pyroelectric element C1 and the capacitor element C2 are discharged.

Then, when the control signal XCG goes to a low level as indicated by D2 in FIG. 7, the discharging transistors TA5 and TA6 turn off and the charging transistors TA3 and TA4 turn on. As a result, the pyroelectric element C1 and the capacitor element C2 are charged through the current mirror transistors TA1 and TA2 of the current mirror circuit 20.

When the charging starts, a voltage VTE at one end of the pyroelectric element C1 rises to a voltage near VCC−VTHP as indicated by D3 in FIG. 7, at which point charging stops. The voltage VTHP is a threshold voltage of the P-type transistor TA1. At the same time, the capacitor element C2 is charged by an electric current proportional to the electric current serving to charge the pyroelectric element C1. As a result, the output voltage VOUT of the node NA2 is converted as indicated by D4, D5, and D6 of FIG. 7. In the figure, D4 indicates an output voltage obtained at a low temperature, D5 indicates an output voltage obtained at an intermediate temperature, and D6 indicates an output voltage obtained at a high temperature. Thus, when the amount of infrared radiation incident on the pyroelectric element C1 increases, the temperature rises and the output voltage VOUT increases.

With the comparative example shown in FIG. 1A, it is difficult to increase a resolution of the detection voltage because the comparative example is configured to detect a voltage change occurring during a discharging period like that indicated by D7 in FIG. 7. Conversely, this embodiment is configured to detect a total amount of electric current flowing during a charging period and convert the total amount of current into a voltage. Thus, a detection voltage having a higher resolution can be obtained because the output voltage VOUT changes by a larger amount with respect to temperature changes, as indicated by D4, D5, and D6 in FIG. 7.

For example, assuming a total amount of charge Q1 is stored in the pyroelectric element C1 and a total amount of charge Q2 is stored in the capacitor element C2, the charge amounts Q1 and Q2 are expressed with the equations (1) and (2) below based on the current IA1 flowing in the transistor TA1 and the current IA2 flowing in the transistor TA2.

Equations (1) and (2)

$$Q1 = \int IA1\, dt \qquad (1)$$

$$Q2 = \int IA2\, dt \qquad (2)$$

Assuming the current mirror circuit 20 has a current mirror ratio K, the charge amount Q2 can be expressed with the equation (3) shown below.

Equation (3)

$$Q2 = K \cdot Q1 \qquad (3)$$

If, for example, the W-to-L ratio of the transistor TA1 and the W-to-L ratio of the transistor TA2 to have a ratio of 1 with respect to each other (e.g., if the W-to-L ratio of the transistor TA1 and the W-to-L ratio of the transistor TA2 are equal to each other), then K equals 1 and Q2 equals Q1. Likewise, if the ratio of the W-to-L ratios is 2, then K equals 2 and Q2 equals 2Q1.

If the capacitor element C2 is made of a paraelectric material and has a capacitance value CC2. Assuming the output voltage reaches an attained voltage (detection voltage) VDT during the charging period, the equation (4) below holds true.

Equation (4)

$$Q2=CC2 \cdot VDT \tag{4}$$

The equations (3) and (4) above can then be used to obtain the attained voltage VDT according to the equation (5) below, and the voltage VDT is proportional to the total amount of charge Q1 of the pyroelectric element C1 as shown in the expression (6) shown below.

Equations (5) and (6)

$$VDT = \frac{K \cdot Q1}{CC2} \tag{5}$$

$$VDT \propto Q1 \tag{6}$$

The capacitance value of the ferroelectric pyroelectric element C1 increases as the temperature increases and, thus, the amount of charge Q1 also increases as the temperature increases. Consequently, the attained voltage VDT of the output voltage VOUT increases as the temperature increases, as indicated by D4, D5, and D6 in FIG. 7.

Figure 8:
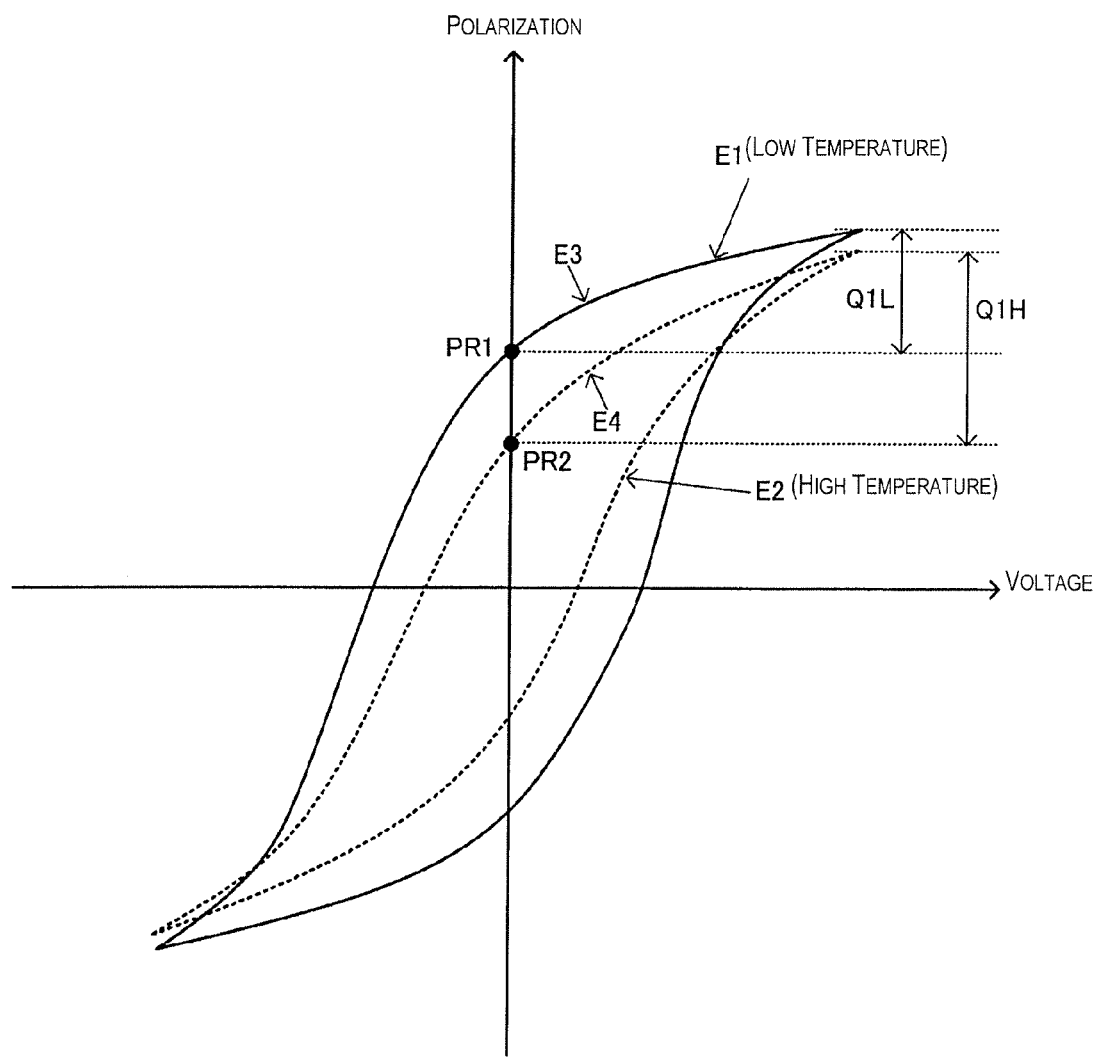
FIG. 8 is a diagram showing an example of a hysteresis loop of a pyroelectric element.

FIG. 8 shows an example of a hysteresis loop of the ferroelectric pyroelectric element C1. In the figure, E1 is a hysteresis loop for a case in which the temperature is low and E2 is a hysteresis loop for a case in which the temperature is high. As shown in FIG. 8, a spontaneous polarization amount PR2 (residual polarity) occurring in the case of the higher temperature hysteresis loop is smaller than a spontaneous polarization amount PR1 occurring in the case of the lower temperature hysteresis loop.

The slopes of the hysteresis loops at any given voltage along the curves E3 and E4 depend on the size of the capacitance value (permittivity) of the pyroelectric element C1. As indicated by E3 and E4, the slope of the higher temperature hysteresis loop is larger than the slope of the lower temperature hysteresis loop at any given voltage. Thus, an average capacitance value of the pyroelectric element C1 is larger when the temperature is higher. Therefore, since the total amount of stored charge Q1 has a larger value Q1H when the temperature is high than a value Q1L obtained when the temperature is low, the attained voltage VDT of the output voltage VOUT is also larger in accordance with the express (6) above.

As is clear from the hysteresis loop of FIG. 8, the total amount of stored charge Q1 of the pyroelectric element C1 can be expressed as shown in the equation (7) below.

Equation (7)

$$Q1 = \int_0^{VCC-VTHP} CC1(VTE) dv \tag{7}$$

In this equation, CC1(VTE) is the capacitance value of the pyroelectric element C1 and is a value corresponding to the slope at each voltage as indicated by E3 and E4 of FIG. 8. Consequently, the capacitance value can be expressed as a function of the voltage VTE. Thus, as shown in the equation (7) above, the total amount of charge Q1 stored in the pyroelectric element C1 is calculated as a value obtained by integrating the capacitance value CC1(VTE) from VTE=0 V to the attained voltage VTE=VCC−VTHP.

As will be explained in more detail later, the capacitance element C2 is a pyroelectric element (ferroelectric) from which infrared radiation is blocked and the total amount of charge Q2 stored in the capacitor element C2 is expressed as shown in the equation (8) shown below.

Equation (8)

$$Q2 = \int_0^{VDT} CC2(VOUT) dv \tag{8}$$

In this equation, CC2(VTE) is the capacitance value of the capacitor element C2 (which is a pyroelectric element) and can be expressed as a function of the output voltage VOUT. Thus, as shown in the equation (8) above, the total amount of charge Q2 stored in the capacitor element C2 is calculated as a value obtained by integrating the capacitance value CC2 (VOUT) from VOUT=0 V to VOUT=VCC−VTHP.

Based on the equations (3), (7), and (8), the equation (9) shown below can be written.

Equation (9)

$$\int_0^{VDT} CC2(VOUT) dv = K \cdot \int_0^{VCC-VTHP} CC1(VTE) dv \tag{9}$$

In the equation (9) above, the capacitance value CC1(VTE) rises as the temperature rises but the capacitance value CC2 (VOUT) is substantially constant with respect to a temperature increase. Consequently, the attained voltage VDT of the node NA2 increases as the temperature rises. More specifically, since the pyroelectric element C1 is exposed to infrared radiation, the temperature of the pyroelectric element C1 increases due to the infrared radiation and the capacitance value CC1(VTE) increases. Meanwhile, since the capacitor element C2 (which is a pyroelectric element) is not exposed to infrared radiation, the temperature of the capacitor element C2 does not rise and the capacitance value CC2(VOUT) remains substantially constant. As a result, an amount of infrared radiation shone onto the pyroelectric element C1 can be detected by measuring the attained voltage VDT.

Thus, in this embodiment, the voltage VOUT (VDT) can be made a fixed value that does not depend on frequency by executing the charging operation for a sufficient amount of time such that the voltage VTE becomes substantially equal to the voltage difference VCC−VTHP. Also, with this embodiment, the detection result is not affected by transient voltage characteristics of the pyroelectric elements, as is the case with the comparative example shown in FIG. 1A. As a result, a stable measurement result that does not depend on a measurement frequency can be obtained.

Figure 9:
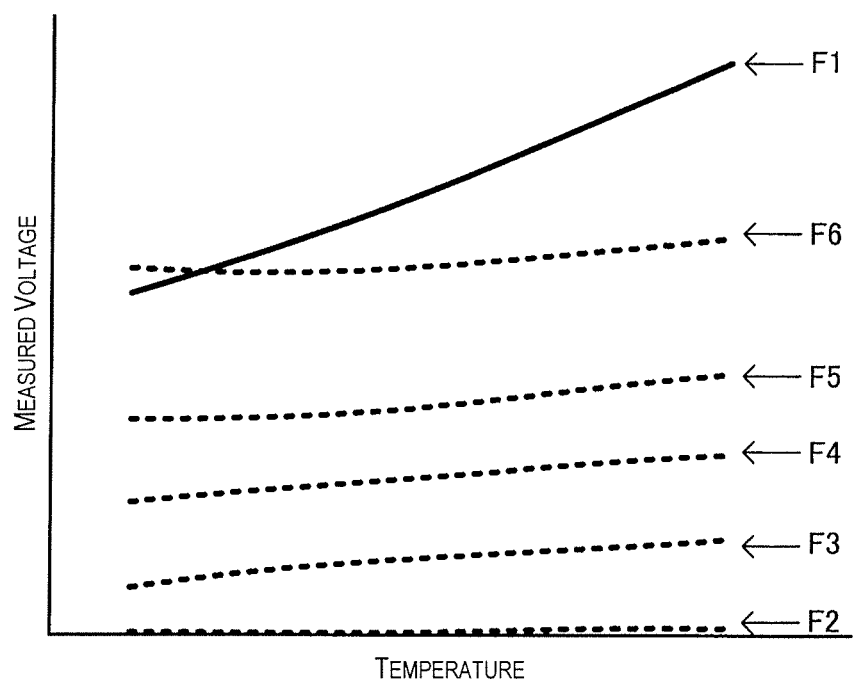
FIG. 9 is graph showing an example of a measured voltage versus temperature diagram for a detection circuit.

For example, the curve F1 in FIG. 9 is an example of a measured voltage versus temperature characteristic of a detection circuit according to the embodiment. As the temperature increases, the measured voltage increases and is not dependent on a measurement frequency. Conversely, the curves F2 to F6 shown in FIG. 9 are examples of measured voltage versus temperature characteristics for the comparative example shown in FIG. 1A. The curve F2 is a characteristic obtained with a low frequency and the curve F6 is a characteristic obtained with a high frequency. Thus, with the comparative example, the measured voltage is dependent on frequency and. The embodiment enables this kind of frequency dependency to be eliminated.

With this embodiment, the detection circuit uses a total current difference converted into a voltage instead of using a transient current difference. As a result, the measured voltage changes by a larger amount with respect to a temperature change. By adjusting a current supply capacity (W/L ratio and current mirror ratio) of the transistor TA2 shown in FIG. 6 and a capacitance value of the capacitor element C2, a change amount ΔVOUT of the output voltage VOUT (which is proportional to a temperature-related change amount ΔQ1 of the charge amount Q1) can be adjusted appropriately such that the change amount ΔVOUT resulting from a temperature change is increased. For example, the current supplying capacity of the transistor TA2 and the capacitance value of the capacitor C2 are adjusted such that the output voltage VOUT is as large as possible without becoming saturated when a maximum temperature is measured. In this way, a wider dynamic range can be achieved for measuring temperatures.

In this embodiment, by setting the control signal XCG to VCC again (as indicated by D8 in FIG. 7) when the output voltage VOUT has become considerably stable, the discharging transistors TA5 and TA6 shown in FIG. 6 are turned on, the pyroelectric elements C1 and the capacitor element C2 are discharged again, and the circuit is prepared again to take another measurement. As a result, the temperature of the pyroelectric element C1 can be measured in a continuous fashion without using a chopper to periodically block infrared radiation from reaching the pyroelectric element C1.

A detection circuit according to this embodiment is not limited to the constituent features shown in FIG. 6. Numerous other variations are possible. For example, FIG. 10 shows an alternative example of a detection circuit.

Figure 10:
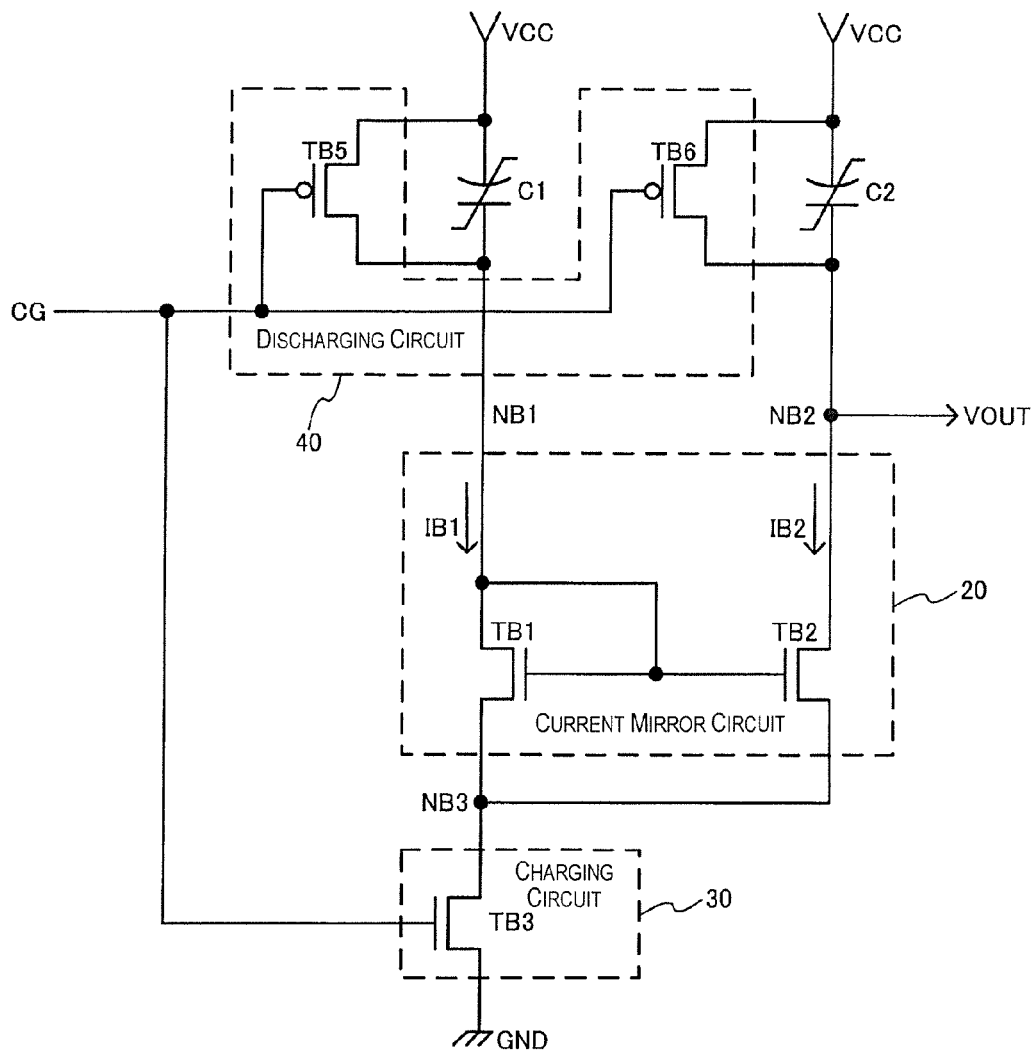
FIG. 10 is a circuit diagram showing a detailed configuration of an alternative example of a detection circuit according to the embodiment.
Figure 11:
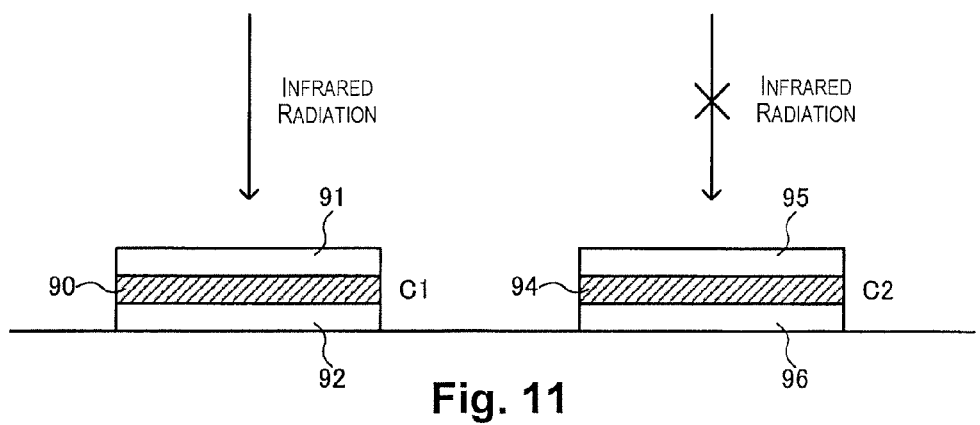
FIG. 11 is a simplified view of pyroelectric elements for explaining a method of using a pyroelectric element as a capacitor element.

The detection circuit shown in FIG. 10 includes a current mirror circuit 20, a pyroelectric element C1, a capacitor element C2, and a charging circuit 30. It also includes a discharging circuit 40.

The pyroelectric element C1 is provided between a node NB1 of the current mirror circuit 20 and a VCC node (broadly called a first power supply node). The capacitor element C2 is provided between a node NB2 of the current mirror circuit 20 and the VCC node. The charging circuit 30 is configured to execute an operation of charging the pyroelectric element C1 and the capacitor element C2 through the current mirror circuit 20. The discharging circuit is provided between the nodes NB1 and NB2 and the VCC node and is configured to execute an operation of discharging the pyroelectric element C1 and the capacitor element C2.

In the example shown in FIG. 10, the current mirror circuit 20 comprises N-type current mirror transistors TB1 and TB2 and the charging circuit 30 comprises an N-type charging transistor TB3. The discharging circuit 40 comprises P-type discharging transistors TB5 and TB6. A drain of the transistor TB5 is connected to an electrode on one end of the pyroelectric element C1 and a source of the transistor TB5 is connected to an electrode on the other side (VCC side) of the pyroelectric element C1. A drain of the transistor TB6 is connected to an electrode on one end of the capacitor element C2 and a source of the transistor TB6 is connected to an electrode on the other side of the capacitor element C2.

When the control signal CG goes to a low level (becomes inactive), the transistor TB5 turns on and the electric potentials of the electrodes on opposite ends of the pyroelectric element C1 become equal, thereby causing the pyroelectric element C1 to discharge. The transistor TB6 also turns on such that the electric potentials of the electrodes on opposite ends of the capacitor element C2 become equal, thereby causing the capacitor element C2 to discharge.

Afterwards, when the control signal CG goes to a high level (becomes active), the transistors TB5 and TB6 turn off and the transistor TB3 turns on. The charging circuit 30 executes an operation of charging the pyroelectric element C1 and the capacitor element C2 through the current mirror circuit 20. An amount of infrared radiation is detected by using a capacitor element C2 to convert a total amount of electric current flowing during a charging period (in which the pyroelectric element C1 is charged) into a voltage.

4. Capacitor Element

In the illustrated embodiment as discussed above, the element C1 is a pyroelectric element that is exposed to infrared radiation and the element C2 is preferably a pyroelectric element from which infrared radiation is blocked. Thus, the capacitor element C2 is a pyroelectric element that has the same structure as the pyroelectric element C1 used for detecting infrared radiation and is blocked from exposure to infrared radiation. Thus, the manufacturing variability of the capacitor element C2 is linked to the manufacturing variability of the pyroelectric element C1. Consequently, when a characteristic of the pyroelectric element C1 vary due to a manufacturing variation, that characteristic variation is compensated by a variation of the capacitor element C2 and a stable measuring result can be obtained.

The pyroelectric element C1 comprises, for example, a ferroelectric film 90 and two electrodes 91 and 92. That is, the pyroelectric element C1 is realized with a structure in which a ferroelectric film 90 is sandwiched between two electrodes 91 and 92. The structure is also such that the pyroelectric element C1 is exposed to infrared radiation and a capacitance value of the element C1 increases as a temperature increases due to the incident infrared radiation.

Meanwhile, the capacitor element C2 also comprises a ferroelectric film 94 and two electrodes 95 and 96. That is, the capacitor element C2 is realized with a structure in which a ferroelectric film 94 is sandwiched between two electrodes 95 and 96, i.e., the same structure as the pyroelectric element C1. The structure is also such that the capacitor element C2 is not exposed to infrared radiation; even when infrared radiation is incident on the pyroelectric element C1, infrared radiation does not reach the capacitor element C2. Thus, as explained previously regarding the equations (1) to (9), the capacitance value of the pyroelectric element C1 increases due to the exposure to infrared radiation and the attained voltage VDT reached by the output voltage VOUT also increases, enabling an amount of infrared radiation incident on the pyroelectric element C1 to be detected.

In order to reduce differences caused by manufacturing variations, it is preferable to form the pyroelectric element C1 and the capacitor element C2 in the same area or in areas that are close to each other. By doing so, the conditions of the manufacturing processes in which the pyroelectric element C1 and the capacitor element C2 are manufactured can be made more similar. However, for example, it is also acceptable to form the pyroelectric element C1 in a sensor area in which a sensor array is formed and to form the capacitor element C2 in a circuit area in which peripheral circuits are formed. In order to reduce variation of the measured voltage caused by manufacturing variations, it is preferable to execute a calibration of a relationship between the measured voltage and the amount of infrared radiation (temperature).

5. Sensor Device

Figure 12A:
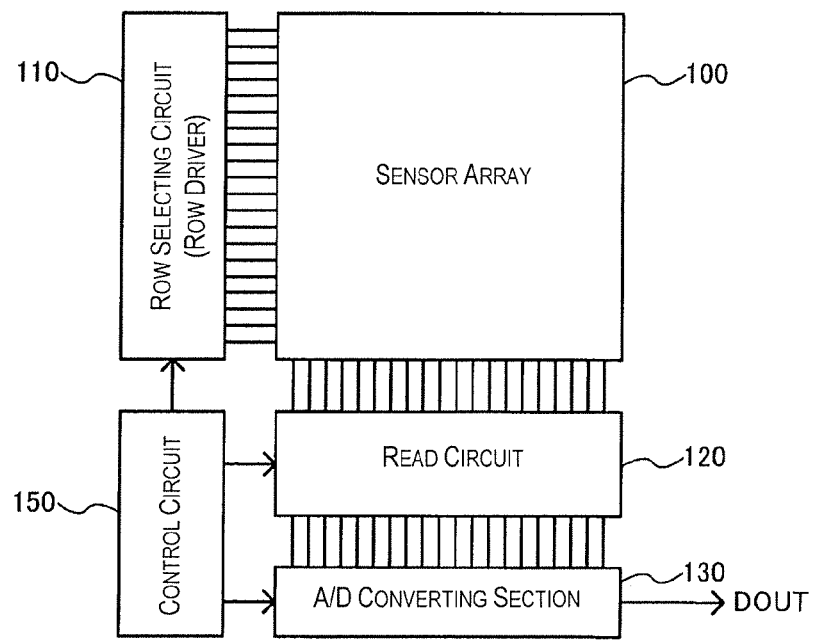
FIG. 12A is a diagram showing a sensor device in which a detection circuit is equipped according to the embodiment.

FIG. 12A shows an example of a sensor device according to the embodiment. This sensor device includes a sensor array 100, a row selecting circuit (row driver) 110, and a read circuit 120. The sensor device can also include an A/D converting section 130 and a control circuit 150. This sensor device can be used to realize an infrared camera used in such devices as, for example, a night vision instrument.

The sensor array 100 (focal plane array) has a plurality of sensor cells arranged in an array form. The sensor array 100 also has a plurality of row lines (word lines or scan lines) and a plurality of column lines (data lines). It is acceptable for the number of row lines or the number of column lines to be one. For example, if the number of row lines is 1, then a plurality of sensor cells is arranged along the direction in which the row line spans (horizontal direction) in FIG. 12A. Meanwhile, if the number of columns is 1, then a plurality of sensor cells is arranged along the direction in which the column line spans (vertical direction).

Figure 12B:
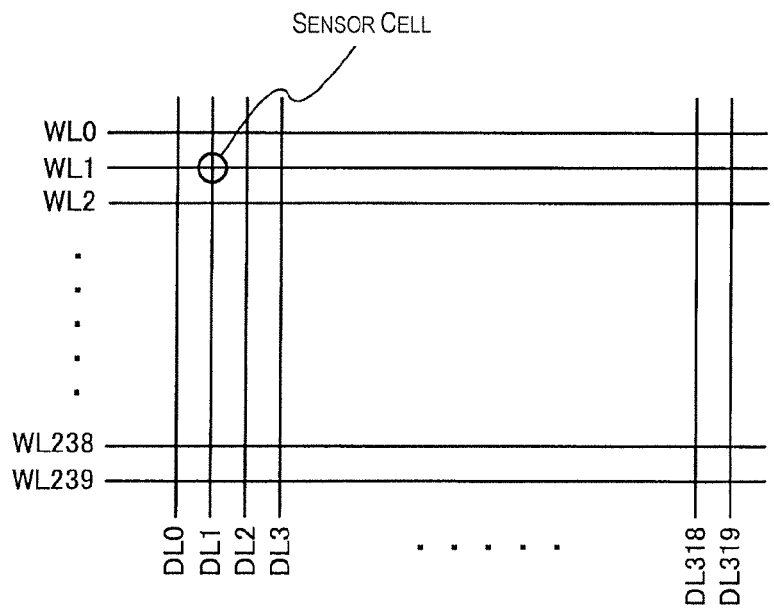
FIG. 12B is a diagram showing arrangement of a sensor array of the sensor device according to the embodiment.

As shown in FIG. 12B, the sensor cells of the sensor array 100 are arranged (formed) in locations corresponding to positions where the row lines and the column lines intersect. For example, the sensor cell indicated in FIG. 12B is arranged in a location corresponding to a position where the row line WL1 intersects the column line DL1. The other sensor cells are formed in similar positions.

The row selecting circuit 110 is connected to the one row line or plurality of row lines. The row selecting circuit 110 then executes a selection operation with respect to each of the rows. Taking a QVGA (320×240 pixels) sensor array 100 (focal plane array) shown in FIG. 12B as an example, the row selecting circuit 110 selects (scans) each of the row lines WL0, WL1, SL2, ..., WL239 sequentially. In other words, the row selecting circuit 110 sends a row line selecting signal (word selecting signal) to the sensor array 100.

The read circuit 120 is connected to one or a plurality of column lines and is configured to execute a read operation with respect to each of the column lines. Taking the GVGA sensor array 100 as an example, the read circuit 120 executes a read operation with respect to a detection signal (detection current or detection electric charge) from each of the column lines DL0, DL1, DL2, ..., DL319.

The A/D converting section 130 serves to convert a detection voltage (measured voltage or reached voltage) acquired by the read circuit 120 into digital data. After a voltage is converted by the A/D converting section 130, the digital data DOUT is outputted. More specifically, the A/D converting section 130 comprises a plurality of A/D converters, each provided with respect one of the column lines. Each of the A/D converters executes a processing to convert a detection voltage acquired by the read circuit 120 at the corresponding column line into digital data. It is acceptable either to provide one A/D converter with respect to each of the column lines or to use one A/D converter to A/D convert the detection voltages of a plurality of column lines in a time divided manner.

The control circuit 150 (timing generating circuit) generates various types of control signals and issues the control signals to the row selecting circuit 110, the read circuit 120, and the A/D converting section 130. For example, the control circuit 150 generates and outputs control signals for charging and discharging (resetting). It also generates and outputs control signals designating timings for the various circuits.

Figure 13:
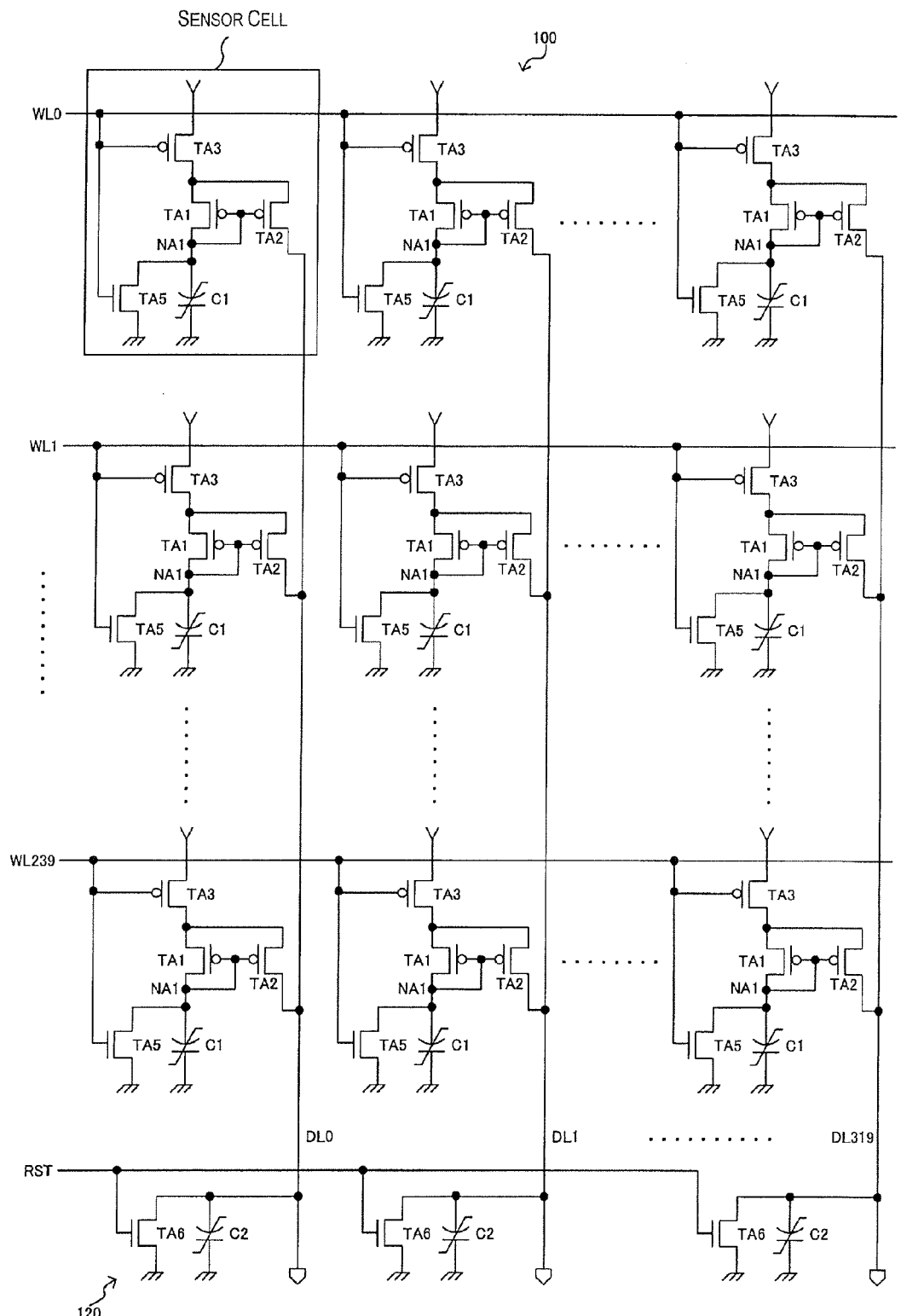
FIG. 13 is a circuit diagram showing a detailed configuration of the sensor array and the read circuit according to the embodiment.

FIG. 13 shows a detailed example of a sensor array 100 and a read circuit 120. It is also possible to contrive a variation by combining the constituent features shown in FIG. 13 with the constituent features and methods of the embodiment shown in FIGS. 3 to 11.

As shown in FIG. 13, the read circuit 120 has a capacitor element C2 provided with respect to each of the one or plurality of column lines. Each of the sensor cells includes a current mirror circuit (TA1 and TA2), a pyroelectric element C1 provided between a ground node GND (first power supply node) and a node NA1 of the current mirror circuit, and a charging circuit (TA3) configured to execute an operation of charging the pyroelectric element C1 and the capacitor element C2 through the current mirror circuit.

Each of the sensor cells includes a sensor cell discharging circuit (TA5). The sensor cell discharging circuit (TA5) is provided between the node NA1 and the ground node GND and is configured to execute an operation of discharging the pyroelectric element C1. Meanwhile, the read circuit 120 includes read circuit discharging circuits (TA6). The read circuit discharging circuits (TA6) are provided between each column line and the ground node GND. For example, each read circuit discharging circuit is provided between the ground node GND and a column line DL (DL0, ..., DL319) corresponding to a second node of the current mirror circuit and is configured to execute an operation of discharging the capacitor element C2.

More specifically, in the example shown in FIG. 13, the transistor TA4 of the example shown in FIG. 6 is omitted and only one charging transistor TA3 is used. The transistor TA3 comprising each charging circuit is selected by a row line WL (WL0 ... WL239) and serves to charge the pyroelectric element C1 inside the corresponding sensor cell. When, for example, the corresponding row line WL goes to a low level, the transistor TA3 starts a charging operation and charges the corresponding pyroelectric element C1 through the current mirror circuit, which comprises the transistors TA1 and TA2.

A drain of each of the transistors TA5 constituting the sensor cell discharging circuits is connected to the node NA1 of the corresponding current mirror circuit. When the corresponding row line WL goes to a high level, the transistor TA5 starts a discharging operation and discharges the electric charge stored in the pyroelectric element C1 to ground.

The read circuit 120 has a transistor TA6 provided with respect to each of the column lines DL (DL0, ..., DL319) and each of the transistors TA6 constitutes a read circuit discharging circuit. A drain of each discharging transistor TA6 and an electrode on one end of each capacitor element C2 is connected to the corresponding column line DL. The discharge transistors TA6 execute an operation of discharging the column lines DL in response to a reset signal RST that operates at the same timing as the row lines WL. For example, when a row line WL is at a high level, the reset signal RST is also at a high level and the N-type discharging transistors TA6 of the read circuit turn on, thus discharging the capacitor elements C2. At the same time, since the row line WL is at a high level, the discharging transistors TA5 of the corresponding sensor cells also turn on and discharge the pyroelectric elements C1 of those sensor cells.

Afterwards, the row line WL and the reset signal RST change to a low level and the discharging transistors TA5 of the sensor cells and the discharging transistors TA6 of the read circuit turn off. Then the charging transistors TA3 of the sensor cells turn on and the pyroelectric elements C1 and the capacitor elements C2 are charged through the current mirror circuits of the sensor cells. After the pyroelectric elements C1 and the capacitor elements C2 have been charged for a prescribed charging time period, a voltage of a column line DL is acquired (sampled) as a detection voltage and the acquired detection voltage is converted from analog to digital by the A/D converting section 130. In this way, a digital datum DOUT corresponding to the detection voltage (measured voltage) is acquired.

A selection processing of the row lines WL is executed, for example, in the order WL0, WL1, WL2, ..., WL239. For example, first the row lines WL (WL0, ..., WL239) and the reset signal RST are set to a high level and the pyroelectric elements C1 of the sensor cells connected to all of the row lines WL and the capacitor elements C2 of the read circuit 120 that correspond to all of the column lines DL0, ..., DL319 are discharged.

After that, the row line WL0 and the reset signal RST are set to a low level and the pyroelectric elements C1 of the sensor cells connected to the row line WL0 and the capacitor elements C2 of the read circuit 120 that correspond to all of the column lines DL0, ..., DL319 are charged. During this charging period, the other row lines WL1, ..., WL239 are held at a high level and charging is not executed in the sensor cells corresponding to these row lines. After the charging time period has elapsed, a detection voltage is acquired from the column lines DL0 to DL319. As a result, a detection voltage is acquired from the sensor cells connected to the row lines WL0.

Next, the row line WL0 and the reset signal RST are set to a high level and the pyroelectric elements C1 of the sensor cells connected to the row line WL0 and the capacitor elements C2 of the read circuit 120 that correspond to all of the column lines DL0, . . . , DL319 are discharged.

After that, the row line WL1 and the reset signal RST are set to a low level and the pyroelectric elements C1 of the sensor cells connected to the row line WL1 and the capacitor elements C2 of the read circuit 120 that correspond to all of the column lines DL0, . . . , DL319 are charged. During this charging period, the other row lines WL0 and WL2, . . . , WL239 are held at a high level and charging is not executed in the sensor cells corresponding to these row lines. After the charging time period has elapsed, a detection voltage is acquired from the column lines DL0 to DL319. As a result, a detection voltage is acquired from the sensor cells connected to the row lines WL1.

Next, the row line WL1 and the reset signal RST are set to a high level and the pyroelectric elements C1 of the sensor cells connected to the row line WL1 and the capacitor elements C2 of the read circuit 120 that correspond to all of the column lines DL0, . . . , DL319 are discharged.

The method of controlling the row lines WL0 to WL239, the reset signal RST, and the read circuit 120 is not limited to the method described above; numerous variations are possible.

6. Electronic Instrument

Figure 14:
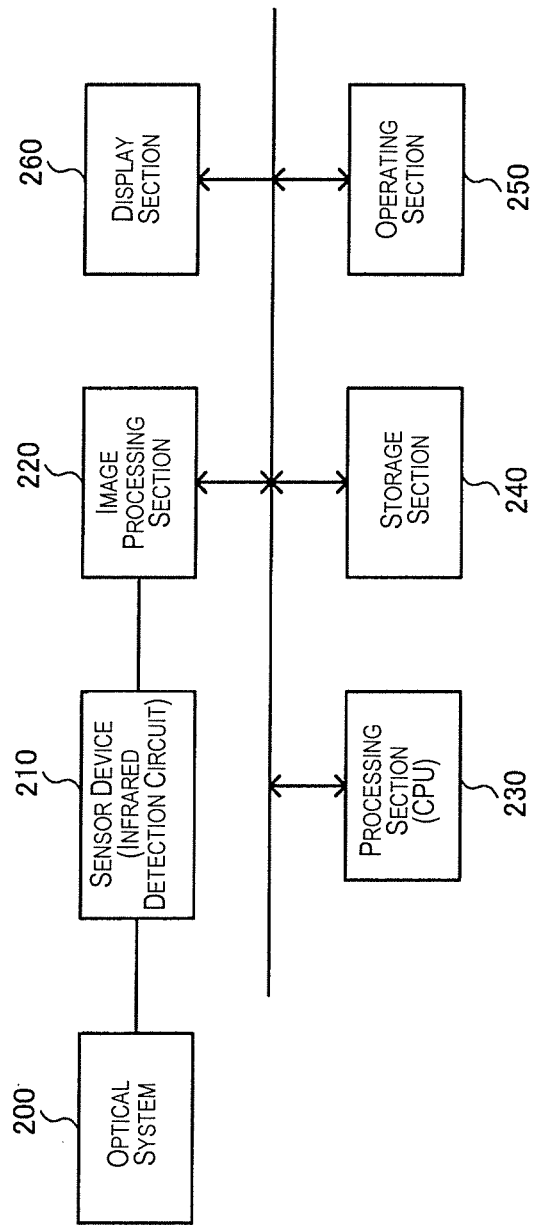
FIG. 14 is a diagram showing an electronic instrument equipped with the sensor device and the detection circuit according to any of the examples in the illustrated embodiment.

FIG. 14 shows an electronic instrument to which the sensor device and the detection circuit according to any of the examples of the embodiment illustrated above can be applied. The electronic instrument includes an optical system 200, a sensor device 210 (detection circuit), an image processing section 220, a processing section 230, a storage section 240, an operating section 250, and a display section 260. An electronic instrument according to this embodiment is not limited to the constituent features shown in FIG. 14. Various changes can be made. For example, a portion of the components (e.g., the optical system, the operating section, and the display section) can be removed and/or other components can be added.

The optical system 200 includes, for example, one lens or a plurality of lens and a drive section to drive the lens or lenses. The optical system 200 serves to form an image of an object on a sensor device 210. If necessary, it also executes a focus adjustment.

The sensor device 210 is the same as the sensor device explained with reference to FIG. 12A and serves to execute image processing of the object image. The image processing section 220 executes image revision processing and other image processing based on the digital image data (pixel data) from the sensor device 210. It is also acceptable to use the detection circuit explained with reference to FIGS. 3 to 6 instead of the sensor device 210 (which is an image sensor).

The processing section 230 controls the entire electronic instrument and controls each block inside the electronic instrument. The processing section 230 comprises, for example, a CPU. The storage section 240 is configured to store various types of information and functions as a work region for the processing section 230 and the image processing section 220. The operating section 250 is an interface through which a user can operate the electronic instrument and comprises, for example, a set of buttons or a GUI (graphical user interface). The display section 260 serves to display a GUI screen or an image acquired by the sensor device 210 and comprises a liquid crystal display, an organic EL display, projector,_or another type of display.

Also, the embodiment described heretofore can be used in an infrared camera employing an FPA (focal plane array), and such infrared camera can be used in a night vision instrument configured to capture an image of an object at night, a thermographic instrument configured to acquire a temperature distribution of an object, an intruder detecting instrument configured to detect an intruding person, an analysis instrument (measuring instrument) configured to analyze (measure) physical information with respect to an object, a security instrument configured to detect a fire or heat, or an FA (factory automation) instrument provided in a factory._And the embodiment described heretofore can be used in a vehicle video system configured to detect and display an image of a person or other object when a vehicle is traveling at night, or a thermographic instrument used for such a purpose as influenza quarantine.

Although an embodiment is described in detail herein, it should be clear to those skilled in the art that many variations can be conceived without departing from the new matter and effects of the present invention in a substantive way. Thus, such variations are included in the scope of the invention. For example, in the specification and the drawings there are some terms that are presented at least once together with other terms that have a broader meaning or the same meaning (e.g., "first power supply node" and "second power supply node"). Each of these terms can be replaced with the corresponding other term at any location in the specification and drawings. The constituent features and operation of the detection circuit, sensor device, and electronic instrument are not limited to those described in the embodiment and numerous variations are possible.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A detection circuit comprising:
a current mirror circuit;
a pyroelectric element disposed between a first power supply node and a first node connected to the current mirror circuit;
a capacitor element disposed between the first power supply node and a second node connected to the current mirror circuit; and
a charging circuit connected to the current mirror circuit to charge the pyroelectric element and the capacitor element though the current mirror circuit.

2. The detection circuit according to claim 1, wherein the charging circuit is configured to charge the pyroelectric element and the capacitor element for a prescribed charging time period before a detection voltage is acquired from the second node.

3. The detection circuit according to claim 1, further comprising
a discharging circuit disposed between the first and second nodes and the first power supply node to discharge the pyroelectric element and the capacitor element.

4. The detection circuit according to claim 3, wherein the discharging circuit is configured to discharge the pyroelectric element and the capacitor element after a detection voltage has been acquired from the second node.

5. The detection circuit according to claim 3, further comprising
a timing regulating circuit, and
the discharging circuit being configured to start discharging the pyroelectric element and the capacitor element at a timing that is designated by the timing regulating circuit and later than a timing that is designated by the timing regulating circuit at which a detection voltage is acquired from the second node.

6. A sensor device comprising:
a detection circuit according to claim 3; and
a timing regulating circuit,
the discharging circuit being configured to start discharging the pyroelectric element and the capacitor element at a timing that is designated by the timing regulating circuit and later than a timing designated by the timing regulating circuit at which a detection voltage is acquired from the second node.

7. The detection circuit according to claim 1, wherein the pyroelectric element includes a pyroelectric material and the pyroelectric element is exposed to infrared radiation, and
the capacitor element includes the pyroelectric material and the capacitor element is blocked from exposure to the infrared radiation.

8. The detection circuit according to claim 1, wherein the current mirror circuit includes
a first current mirror transistor disposed between the charging circuit and the first node with a gate and a drain of the first current mirror transistor being connected to the first node, and
a second current mirror transistor disposed between the charging circuit and the second node with a gate of the second current mirror transistor being connected to the first node and a drain of the second current mirror transistor being connected to the second node.

9. The detection circuit according to claim 1, wherein the charging circuit includes at least one charging transistor disposed between a second power supply node and the current mirror circuit, the at least one charging transistor being configured to turn on during a charging time period when the pyroelectric element and the capacitor element are being charged and to turn off during a discharging time period when the pyroelectric element and the capacitor element are being discharged.

10. The detection circuit according to claim 1, further comprising
a timing regulating circuit,
the charging circuit being configured to start charging the pyroelectric element and the capacitor element at a first timing designated by the timing regulating circuit so that a detection voltage is acquired from the second node at a second timing that is designated by the timing regulating circuit and later than the first timing.

11. A sensor device comprising:
a detection circuit according to claim 1; and
a timing regulating circuit,
the charging circuit being configured to start charging the pyroelectric element and the capacitor element at a first timing designated by the timing regulating circuit so that a detection voltage is acquired from the second node at a second timing that is designated by the timing regulating circuit and later than the first timing.

12. An electronic instrument including the sensor device according to claim 11.

13. An electronic instrument including the detection circuit according to claim 1.

14. A sensor device comprising:
a sensor array having a plurality of sensor cells;
one or more row lines;
one or more column lines;
a row selecting circuit connected to the one or more row lines; and
a read circuit connected to the one or more column lines, the read circuit including one or more capacitor elements respectively connected to the one or more column lines, and
each of the sensor cells including
a current mirror circuit,
a pyroelectric element disposed between a first power supply node and a first node connected to the current mirror circuit, and
a charging circuit connected to the current mirror circuit to charge the pyroelectric element and the capacitor element though the current mirror circuit.

15. The sensor device according to claim 14, wherein each of the sensor cells includes a sensor cell discharging circuit disposed between the first node and the first power supply node to discharge the pyroelectric element.

16. The sensor device according to claim 14, wherein the read circuit includes one or more read circuit discharging circuits disposed between the first power supply node and the one or more column lines, respectively, to discharge a corresponding one of the capacitor elements.

* * * * *